(12) United States Patent
Diels et al.

(10) Patent No.: US 8,379,285 B1
(45) Date of Patent: Feb. 19, 2013

(54) RADIO FREQUENCY SELF-REGENERATED LOCKED OPTICAL OSCILLATOR

(75) Inventors: Jean-Claude Diels, Albuquerque, NM (US); Alexandre B. Braga, Albuquerque, NM (US); Ravinder Jain, Albuquerque, NM (US); Ronald R. Kay, Albuquerque, NM (US)

(73) Assignee: STC.UNM, Alburquerque, NM (US)

( * ) Notice: Subject to any disclaimer, the term of this patent is extended or adjusted under 35 U.S.C. 154(b) by 552 days.

(21) Appl. No.: 12/636,565

(22) Filed: Dec. 11, 2009

Related U.S. Application Data

(60) Provisional application No. 61/203,091, filed on Dec. 18, 2008.

(51) Int. Cl.
*G02B 26/00* (2006.01)
(52) U.S. Cl. ........................................ 359/239; 359/900
(58) Field of Classification Search .................. 359/239, 359/900
See application file for complete search history.

(56) References Cited

PUBLICATIONS

Braga, A. B., "Bidirectional Mode-Locked Fiber Ring Laser", Dissertation, submitted in Partial Fulfillment of the Requirements for the Degree of Doctor of Philosophy, Optical Sciences and Engineering, The University of New Mexico, Albuquerque, New Mexico, (May 2010), 145 pgs.
Braga, A., et al., "Bidirectional mode-locked fiber ring laser using passively controlled threshold gating", *Optical Science & Engineering, CLEO/QUELS*: 2010, (May 16-21, 2010, San Jose, CA), (2010), 2 pgs.
Braga, A., et al., "Bidirectional mode-locked fiber ring laser using self-regenerative, passively controlled, threshold gating", *Optics Letters*. 35(15), (2010), 1-3.
Kieu, K., et al., "All-fiber bidirectional passively mode-locked ring laser", *Optics Letters*, 33(1), (2008), 64-66.

*Primary Examiner* — Jack Dinh
(74) *Attorney, Agent, or Firm* — Schwegman Lundberg & Woessner, P.A.

(57) ABSTRACT

Apparatus, systems, and methods to construct and operate a radio frequency self-regenerated locked optical oscillator can be used in a variety of applications. Stable synchronization of an optical oscillator can be achieved by driving an amplitude modulator with a radio frequency (RF) signal regenerated from the cavity of the optical oscillator. Additional apparatus, systems, and methods are disclosed.

18 Claims, 4 Drawing Sheets

RADIO FREQUENCY SELF-REGENERATED LOCKED OPTICAL OSCILLATOR

RELATED APPLICATION

This application claims priority under 35 U.S.C. 119(e) from U.S. Provisional Application Ser. No. 61/203,091, filed 18 Dec. 2008, which application is incorporated herein by reference in its entirety.

FIELD OF THE INVENTION

This invention relates generally to systems using an optical oscillator.

BACKGROUND

In harmonically mode-locked lasers, an amplitude modulator may be used to generate a train of pulses at the round-trip rate of the laser, or a multiple, N, thereof. The repetition rate of the laser cavity is given by $f_o = N(v_g)/P$, where $v_g$ is the group velocity of the pulse in the propagating medium. P equals the perimeter of the cavity in the case of a ring laser or equals 2L in the case of a linear cavity, where 2L is the round-trip length of the cavity. This technique, called active mode-locking, requires an essentially perfect synchronization (and phase control) of the electrical signal to the modulator with the optical pulse circulating in the cavity.

BRIEF DESCRIPTION OF THE FIGURES

Embodiments of the invention are illustrated by way of example and not limitation in the figures of the accompanying drawings in which.

DESCRIPTION

The following detailed description refers to the accompanying drawings that show, by way of illustration and not limitation, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, solutions to problems of synchronization for an optical oscillator can be provided, even if the repetition rate is constantly changing due to changes in the length of the oscillator's cavity following drifts in temperature. Stable synchronization can be achieved by driving an amplitude modulator with a radio frequency (RF) signal regenerated from the cavity itself, which is at its fundamental repetition rate (or multiples of the fundamental repetition rate). In various embodiments, a low cost straight forward architecture for an optical oscillator can be provided to implement a RF self-regenerative system that can be used alone, or in combination with a passive mode-locking mechanism, to produce stable harmonic mode-locked optical pulses.

Figure 1:
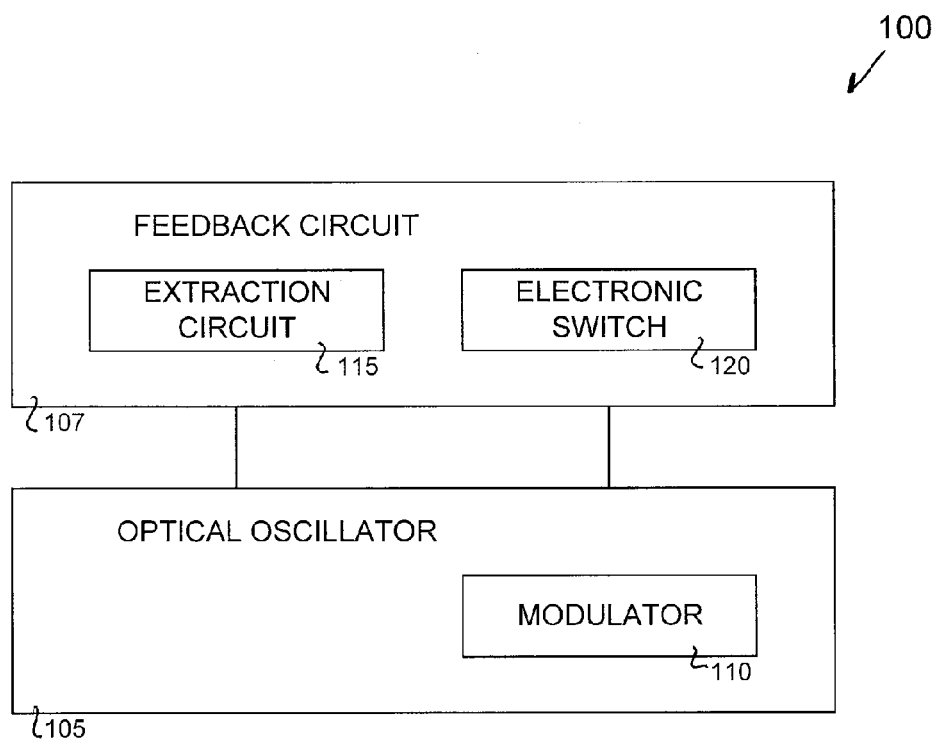
FIG. 1 shows a block diagram of an embodiment of an apparatus that includes an optical oscillator coupled to a radio frequency feedback circuit to produce stable mode-locked optical pulses.

FIG. 1 shows a block diagram of an embodiment of an apparatus 100 that includes an optical oscillator 105 coupled to a radio frequency feedback circuit 107 to produce stable mode-locked optical pulses. Optical oscillator has a cavity and a modulator 110, where modulator 110 is implemented to modulate an optical signal operatively transmitted in the cavity. Feedback circuit 107 can include an extraction circuit 115 and electronic switch 120. Extraction circuit 115 can be configured to lock onto an electronic radio frequency signal generated from a portion of the optical signal, where the portion is extracted from the cavity of optical oscillator 110. Extraction circuit 115 can include a synchronous oscillator circuit and/or a phase-locked loop (PLL) circuit. In the absence of an input signal, a synchronous oscillator operates at its own resonant frequency. With a signal applied to the synchronous oscillator, the synchronous oscillator adjusts to the signal and tracks the waveform of the signal. Electronic switch 120 coupled to extraction circuit 115 can be arranged such that the electronic radio frequency signal is coupled to modulator 110 from extraction circuit 115. Optical oscillator 105 in conjunction with feedback circuit 107 can operatively output a stable optical pulse train.

Figure 2:
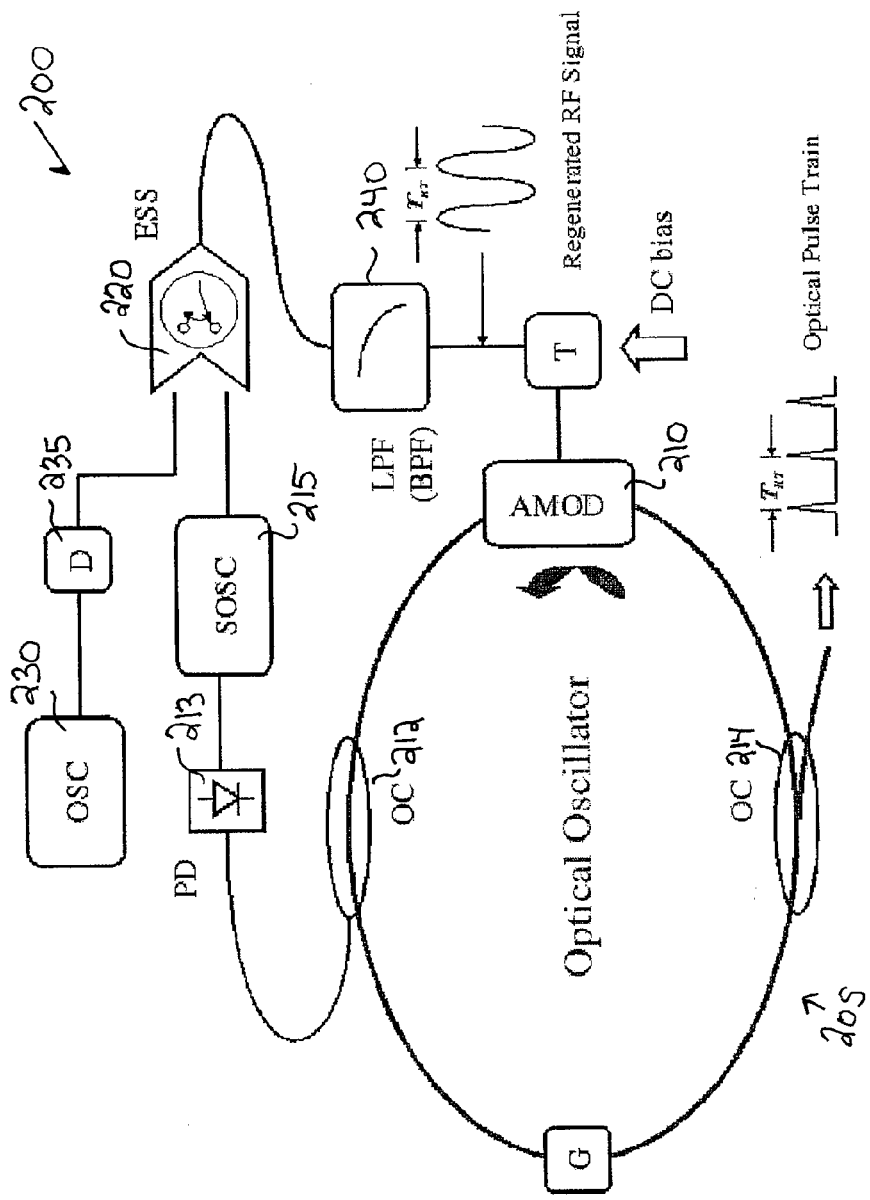
FIG. 2 shows a block diagram of an embodiment of an apparatus including an optical oscillator having a cavity and a modulator.

FIG. 2 shows a block diagram of an embodiment of an apparatus 200 including an optical oscillator 205 having a cavity and a modulator 210. The cavity can include a gain medium, which has a cavity gain (G). Optical oscillator 205 can include a ring laser or a laser with a linear cavity. For a fiber laser used in optical oscillator 205, the fiber laser can be an erbium doped fiber (EDF). Modulator 210 can be an amplitude modulator (AMOD), which is an active element that can provide modulated loss. Optical oscillator 205 can include two optical couplers (OCs) 212 and 214, which are used to "tap" out a percentage of a laser signal in optical oscillator 205. The percentage may be a small percentage such as 1%. Other percentages can be realized. OCs 212 and 214 can tap out different percentages from each other. OC 212 is configured to provide a signal to a RF feedback system that includes an extraction circuit 215 and an electronic switch 220. OC 214 is configured to provide an output optical signal.

In various embodiments, a generic optical oscillator has noise components at a desired repetition rate which provides a "mode beating" that can be picked up by a photodetector. To assist with the starting of the mode-locking process, amplitude modulator 210, biased as to minimize light transmission, can be used to initiate mode-locking by creating a loss modulation that matches the repetition rate of the laser used. This control can be attained using an electronic RF pulsed signal, at the round trip time of the cavity, $T_{RT}$, or higher order harmonics to drive the modulator.

An external electronic oscillator (OSC) 230 initially can provide the input signal to modulator 210 at a frequency quasi-resonant with the repetition rate of the laser. The insertion of a low pass filter (LPF) 240, near the band range of the frequency of interest, helps with the conditioning of the driving signal by providing an approximate sinusoidal waveform. In various embodiments, a low pass filter can be used for the fundamental mode. For higher order frequencies, a band pass filter (BPF) can be used instead. As the laser begins to be externally tuned to the nearly resonant frequency, extraction circuit 215, such as a clocking-extraction device, can be used to track the optical signal. Extraction circuit 215 can be implemented as a synchronous oscillator circuit (SOSC).

The optical signal can be monitored at the output port of optical coupler 212 with a photodetector 213 that converts the optical pulses to an RF signal. Once SOSC 215 locks onto the RF signal, electronic switch 220, such as an electronic synchronous switch (ESS), can be designed with a latching characteristic that passes control of the driving signal to SOSC 215. SOSC 215 may lock onto the RF signal in a round trip time plus a settling time. The latching characteristic can provide for "in synch" operation to prevent disturbance in the switch-over process. From this point on, the cavity begins to run on a self-regenerative mode. For enhanced operation of the synchronous oscillator, an amplitude limiter can be inserted between detector 213 and SOSC 215. Its function is to prevent amplitude swings in the signal picked up at detector 213 to introduce temporal jitter in the SOSC 215.

In various embodiments, components in architectures similar to or identical to the architecture of FIG. 2 can use low cost parts, which are normally found in an optics laboratory or can be easily constructed. This does not limit other embodiments from using other suitable parts, manufacturers, configurations, or methods. Since the tuning of the laser's resonant frequency by the external electronic oscillator 230 need not be accurate. a generic, low cost, function generator, without great precision, can be used in various embodiments. A delay line 235, D, can be used to enable synchronization between the free running frequency signal provided by external electronic oscillator 230 and the regenerated signal produced by SOSC 215. Delay line 235 can be comprised of a coaxial cable, an extra optical path between a laser and a photodetector, or other suitable device. Depending on the application (e.g., very high repetition rate lasers), delay line 235 can include a device that can deliver sub-picosecond delay time increments.

In various embodiments, electronic synchronous switch 220 is configured as a device that switches driving operation of modulator 210 from external oscillator 230 to the locking mechanism of SOSC 215. A circuit design including ESS 220 and SOSC 215 can be implemented in conjunction with photodetector 213, where photodetector 213 is comprised of an appropriate detector with a response time faster than the period of the pulse train provided by optical oscillator 205. Photodetector 213 can be combined with an amplifier to provide the signal level required to drive synchronous optical oscillator 205.

In various embodiments, SOSC 215 is designed as to be efficiently able to lock and regenerate the cavity's "frequency of interest" (fundamental or higher harmonic modes). It may also be replaced, depending on the application, by PLL circuits which are commercially available in DIP package integrated circuits (ICs). SOSC 215 provides an electronic tracking/locking mechanism as part of a feedback system for an optical oscillator.

Low pass filter 240 can be used to provide modulator 210 a fundamental frequency signal with a near sinusoidal shape. The signal can be applied to an input terminal section, T, which may also receive a bias signal for AMOD 210, such as a DC bias. For the case of high harmonic mode-locking, a band pass filter centered at the order of the harmonic can be used. Because of the robustness of the locking mechanism, a high 'Q' characteristic is not required in various embodiments. Moreover, depending on the type of optical oscillator and the constrained requirements on the loss modulation, a pulse generator can be used instead to provide a narrow pulsed signal to the modulator. In such a case, the signal coming from the locking mechanism can be used as triggering signal to the pulse generator.

A device that can modulate the amplitude of the optical signal from an RF controlling signal can be used as an amplitude modulator 210. The amplitude modulators most commonly used in optical oscillators are Mach-Zender types, which are interferometer devices that are based on the Pockel's effect. Since the various embodiments are suited for any generic optical oscillator, these modulators can be of any size and shape and can be fiber coupled or free air types, depending on the application.

In various embodiments, apparatus 200 can use an optical oscillator, with no special features, coupled with a feedback system. Any type of laser can be used in optical oscillator 205. If the cavity of the laser is not designed to sustain passive mode-locking, then optical oscillator 205 with the feedback system can be used to maintain an active mode-locked lasing. Otherwise, the feedback system can be used as a self-starting mechanism for the passive mode-locked cavity. In this case, depending on the passive mode-locking mechanism used, a fast saturable absorber (FSA) can be introduced on the optical path.

In various embodiments, apparatus 200 can be used with respect to the problem of active process initialization. This problem relates to the fact that a "tracking-and-locking" circuit, although very efficient to track and regenerate electronically a signal from an optical oscillator, in most cases, will not start by itself. In some situations, an external element, such as a signal generator will be needed to provide the initial signal to the modulator. However, it is desired to be able to create the right conditions for a self-driven, self-sustained mode-lock situation and not to maintain the outside source as the driver for the modulator indefinitely, since it operates in a fixed frequency. In various embodiments, a solution to the problem can be provided by introducing a logic circuit design that switches its operating mode from the external source to the "tracking-and-locking" circuit without introducing any discontinuity problems to the laser. In other words, the switching happens in a robust manner that does not disturb the dynamics of system.

Figure 3:
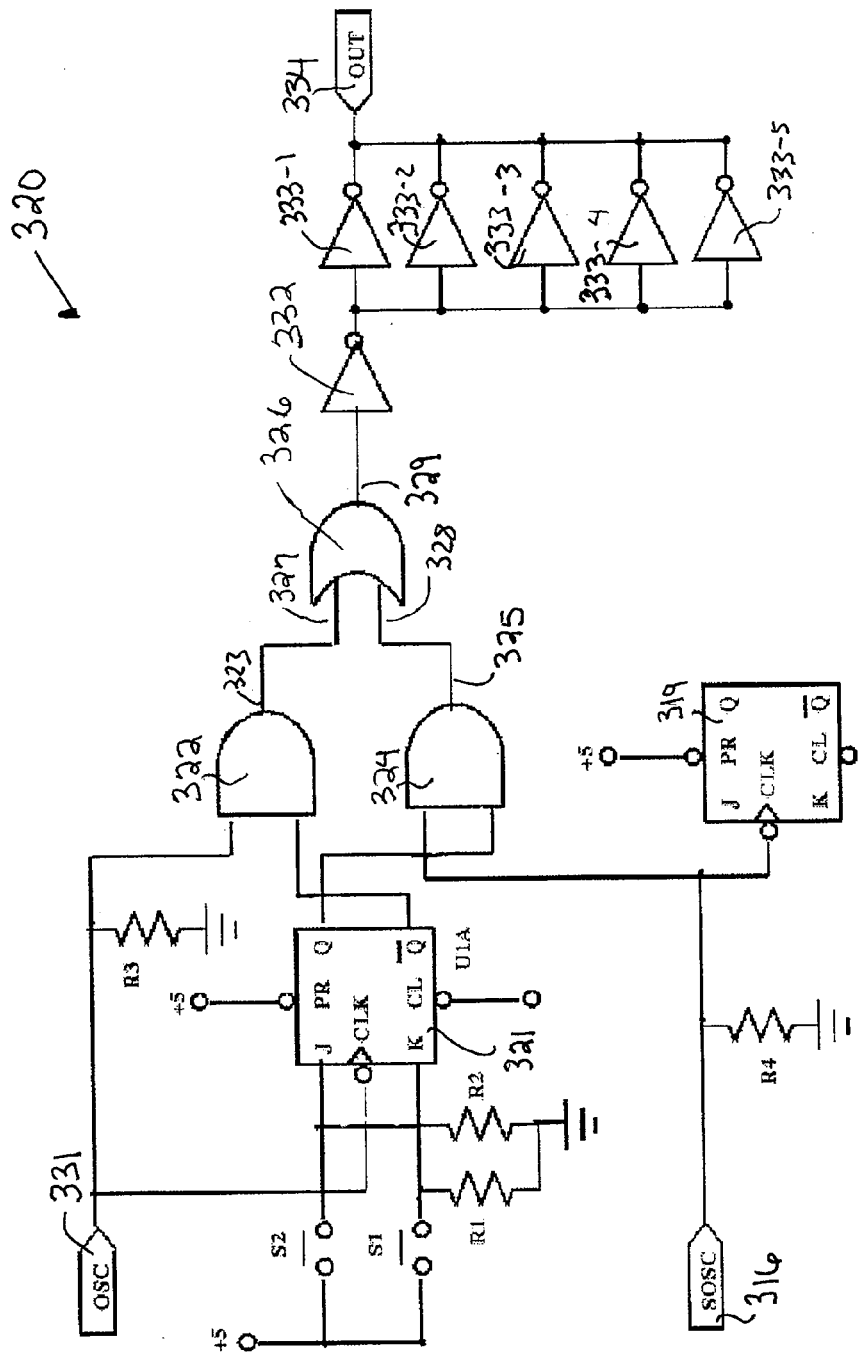
FIG. 3 shows a diagram of an embodiment of an electronics synchronous switch that can be implemented in the apparatus of FIG. 2.

FIG. 3 shows a diagram of an embodiment of an electronics synchronous switch 320 that can be implemented in apparatus 200 of FIG. 2. ESS 320 provides a circuit designed to efficiently transition control of a modulator's driving signal from an external frequency generator to a controlled, self-regenerated signal loop such as from OSC 230 to the SOSC controlled, self-regenerated signal loop shown in FIG. 2. A circuit that addresses the smooth transition from imposed oscillation to self-regenerative mode can be achieved with ESS 320 or other similar embodiments for a switching circuit. ESS 320 device can select one of two waveforms, such as square-waves, and send the selected waveform to the circuit output port 334, also referred to as output 334. For example, each input can be a standard TTL, 50% duty cycle waveform. The SOSC input 316 is a phase locked replica of the OSC waveform, such as from OSC 230 of FIG. 2. In various embodiments, its timing is adjusted by means of a commercial delay device to be essentially perfectly coincident with the OSC waveform at the device input. A J-K flip-flop 321 can be triggered on a negative clock edge. This triggering allows the switching time to occur during the waveform "low" interval, which keeps it from disturbing the output signal during transition.

Synchronous switching without artifacts is essentially assured in switching from OSC input port 331, also referred to as OSC input 331, to the SOSC input port 316, also referred to as SOSC input 336, because the SOSC is already steady state locked to the OSC input, but the converse is not true. Once switched to the SOSC input 316, a laser system, using the architecture of FIG. 2 for example, is free running with respect to the OSC input and is neither phase nor frequency locked to this source. Switch 51 can be initially activated momentarily to ensure that the device start up is from the electronic oscillator source. The first falling edge of the oscillator waveform occurring while 51 is closed transfers a logical 0 to output Q and logical 1 to output ⁻Q. This enables AND gate 322 and allows its output 323 to follow the oscillator waveform. The logical 0 at the Q output similarly disables AND gate 324 and forces output 325 to a constant logical 0. Therefore, OR gate 326 only responds to input 327 (from output 323), which is the same as the OSC waveform. Once triggered, J-K flip flop 321 will not respond to additional contact closures from the activated switch and therefore contact bounce will not gate the selected output. To select the SOSC input 316, which is also coupled to J-K flip flop 319, S2 can be activated momentarily. At the first falling edge of the OSC waveform, output Q is set to logical 1 and ⁻Q to logical 0. This disables AND gate 322 and forces output 323 to logical 0; similarly AND gate 324 is now enabled and output 325 will follow input SOSC. OR gate 326 now has a constant 0 at input 327, but input at input 328 follows SOSC input and causes output 329 to follow the SOSC input. The switchover between OSC and SOSC sources is then complete. Although the Q and ⁻Q outputs of J-K flip flop 321 require time to change state once triggered on the negative edge of the clock input, this state change occurs while inputs OSC and SOSC are both at a logical 0. Therefore, both AND gate 322 and AND gate 324 outputs are at logical 0 during the selection transition and keep output of OR gate 326 at logical 0 regardless of the state of J-K FLIP FLOP 321 outputs Q and ⁻Q.

This is the interval corresponding to the "low" state of the input waveforms. By the time of the first rising edge at SOSC input 316 after SOSC selection, the selection changeover has been completed, and the SOSC logical 1 level is transferred to output 334 without any disturbance. Output 326 of OR gate 326 has transitioned from being driven by OSC input 331 to SOSC input 316 during the logical "low" ½ cycle of the waveform. To preserve input polarity, inverter 332 inverts the signal at output 329 before driving inverting buffers 333-1-333-5. Inverting buffers 333-1-333-5 are paralleled to increase output drive current. The parallelism can be realized with inverter 332 and inverting buffers 333-1-333-5 configured in a monolithic device, where excellent dynamic matching between devices on the same IC wafer may essentially be ensured. This in turn allows current sharing of the paralleled outputs to increase current drive. Therefore, the laser system, apparatus 200 of FIG. 2 for example, receives its next input pulse precisely on time but now is driven by SOSC instead of OSC. The laser fires at the expected time and triggers the detector, which then applies an input pulse to the SOSC at the correct time to maintain the output frequency (positive feedback). Input OSC can be originally been set to the free running frequency of the laser.

The instability of PLL circuits with respect to clock extraction can be addressed in various embodiments. For example, an alternative to the conventional use of a PLL as a clock extraction mechanism can be realized with the introduction of a SOSC. In comparison to a PLL, this type of circuit provides a more robust self-regenerating lock. An SOSC locks well under poor signal-to-noise ratio (SNR) conditions and can have greater sensitivity to low level signals. Additionally, high gain bandwidth devices can be used in the design to allow lock to occur using amplified detected signals, as opposed to further signal conditioning that are sometimes associated with inputs to PLLs. In various embodiments, synchronous oscillators can be made to respond directly to vary fast input signals, as recovered by a photodetector, eliminating the need to convert input pulse train to a sine or square wave, as is typically required with PLLs.

RF self-regenerated optical oscillators, as taught herein, can be realized in a variety of configurations. For example, the RF feedback system can be used with any type of optical oscillator. Any mode-locked laser system can incorporate this system for various purposes including, but not limited to, promoting self-stabilization, providing start up conditions, providing a rigid control of the oscillating mode in the case of a complete active mode-locking, or combinations thereof. In various embodiments, systems, in accordance with the embodiments taught herein, can be constructed from parts that are normally found in optics laboratories, such as RF amplifiers, delay lines, regular function generators, coaxial type filters, and some basic electronics components used for printed circuit boards.

Figure 4:
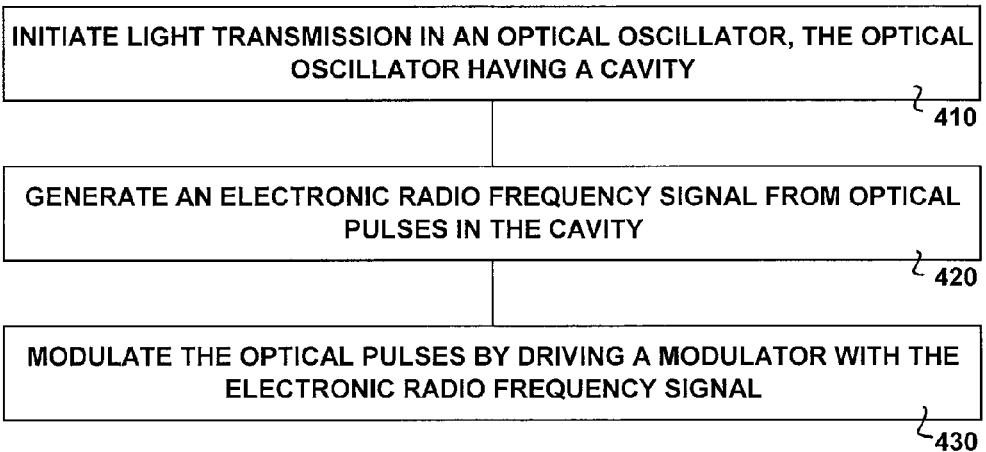
FIG. 4 shows features of an embodiment of a method for operating a radio frequency self-regenerated locked optical oscillator.

FIG. 4 shows features of an embodiment of a method for operating a radio frequency self-regenerated locked optical oscillator. At 410, light transmission is initiated in an optical oscillator, where the optical oscillator has a cavity. The initiation of the light transmission in the optical oscillator can include creating a loss modulation that matches a repetition rate of a laser used in the optical oscillator. The initiation of the light transmission in the optical oscillator can be realized by inputting a signal from an electronic oscillator to the modulator at a frequency quasi-resonant with a repetition rate of a laser used in the optical oscillator. The electronic oscillator can be disposed external to the optical oscillator.

At 420, an electronic radio frequency signal is generated from optical pulses in the cavity. The electronic radio frequency signal can be generated from tapping the optical oscillator using an optical coupler and directing the extracted signal to a photodetector that converts the extracted optical signal to an electronic signal. The electronic signal can be used with an extraction circuit to track the optical pulses in the optical oscillator. Tracking the optical pulses can include locking onto an electronic radio frequency signal converted from a portion of the optical pluses extracted from the optical oscillator. Control of driving the modulator from an electronic oscillator can be passed to the circuit that locks on to the electronic radio frequency signals converted from a portion of the optical pluses.

At 430, the optical pulses are modulated by driving a modulator with the electronic radio frequency signal. This process can provide an implementation of a RF self-generative system that can produce stable harmonic mode-locked optical pulses.

Although specific embodiments have been illustrated and described herein, it will be appreciated by those of ordinary skill in the art that any arrangement that is calculated to achieve the same purpose may be substituted for the specific embodiments shown. Various embodiments can use permutations and/or combinations of embodiments described herein. It is to be understood that the above description is intended to be illustrative, and not restrictive, and that the phraseology or terminology employed herein is for the purpose of description.

What is claimed is:
1. An apparatus comprising:
an optical oscillator having a cavity and a modulator, the modulator to modulate an optical signal operatively transmitted in the cavity;

an extraction circuit to lock onto an electronic radio frequency signal generated from a portion of the optical signal, the portion extracted from the cavity; and an electronic switch coupled to the extraction circuit arranged to couple the electronic radio frequency signal to the modulator from the extraction circuit.

2. The apparatus of claim 1, wherein the optical oscillator includes an optical coupler to output an optical pulse train.

3. The apparatus of claim 1, wherein the extraction circuit includes a synchronous oscillator circuit.

4. The apparatus of claim 1, wherein the extraction circuit includes a phase-locked loop circuit.

5. The apparatus of claim 1, wherein the apparatus includes:
   an optical coupler to extract the portion of the optical signal from the cavity; and
   a photodetector coupled between the optical coupler and the extraction circuit, the photodetector to generate the electronic radio frequency signal.

6. The apparatus of claim 1, wherein the apparatus includes a low pass filter coupled between the electronic switch and the modulator.

7. The apparatus of claim 1, wherein the apparatus includes a band pass filter coupled between the electronic switch and the modulator.

8. The apparatus of claim 1, wherein the apparatus includes an electronic oscillator coupled to the electronic switch such that the electronic switch operatively switches control of providing a drive signal to the modulator from the electronic oscillator to the extraction circuit.

9. The apparatus of claim 1, wherein the apparatus includes the electronic switch includes a logic circuit that operatively switches control of providing the drive signal to the modulator from the electronic oscillator to the extraction circuit.

10. The apparatus of claim 1, wherein the apparatus includes a delay line, the delay line configured to couple the electronic oscillator to the electronic switch.

11. The apparatus of claim 1, wherein the modulator includes an amplitude modulator.

12. The apparatus of claim 1, wherein the optical oscillator includes an erbium doped fiber.

13. A method comprising:
   initiating light transmission in an optical oscillator, the optical oscillator having a cavity;
   generating an electronic radio frequency signal from optical pulses in the cavity; and
   modulating the optical pulses by driving a modulator with the electronic radio frequency signal.

14. The method of claim 13, wherein initiating light transmission in the optical oscillator includes creating a loss modulation that matches a repetition rate of a laser used in the optical oscillator.

15. The method of claim 13, wherein initiating light transmission in the optical oscillator includes inputting a signal from an electronic oscillator to the modulator at a frequency quasi-resonant with a repetition rate of a laser used in the optical oscillator.

16. The method of claim 13, wherein the method includes tracking the optical pulses.

17. The method of claim 16, wherein tracking the optical pulses includes locking onto an electronic radio frequency signal converted from a portion of the optical pluses, the portion extracted from the optical oscillator.

18. The method of claim 13, wherein the method includes passing control of driving the modulator from an electronic oscillator to a circuit that locks on to electronic radio frequency signals converted from a portion of the optical pluses, the portion extracted from the optical oscillator.

* * * * *

UNITED STATES PATENT AND TRADEMARK OFFICE
CERTIFICATE OF CORRECTION

| | |
|---|---|
| PATENT NO. | : 8,379,285 B1 |
| APPLICATION NO. | : 12/636565 |
| DATED | : February 19, 2013 |
| INVENTOR(S) | : Diels et al. |

It is certified that error appears in the above-identified patent and that said Letters Patent is hereby corrected as shown below:

In the Claims

In column 8, line 27, in Claim 17, delete "pluses" and insert --pulses--, therefor In column 8, line 32, in Claim 18, delete "pluses" and insert --pulses--, therefor Signed and Sealed this
Twenty-eighth Day of January, 2014

Michelle K. Lee
*Deputy Director of the United States Patent and Trademark Office*